US008941946B2

(12) United States Patent
Sekii (10) Patent No.: US 8,941,946 B2
(45) Date of Patent: Jan. 27, 2015

(54) MOTOR INCLUDING DYNAMIC BEARING WITH SEAL PORTION AND DISK DRIVE APPARATUS INCLUDING THE SAME

(71) Applicant: Nidec Corporation, Kyoto (JP)

(72) Inventor: Yoichi Sekii, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/886,290

(22) Filed: May 3, 2013

(65) Prior Publication Data

US 2014/0268411 A1 Sep. 18, 2014

Related U.S. Application Data

(60) Provisional application No. 61/781,239, filed on Mar. 14, 2013.

(51) Int. Cl.
| | | |
|---|---|---|
| G11B 19/20 | (2006.01) | |
| G11B 25/04 | (2006.01) | |
| H02K 7/08 | (2006.01) | |

(Continued)

(52) U.S. Cl.
CPC .......... *G11B 19/2036* (2013.01); *H02K 5/1675* (2013.01); *H02K 7/085* (2013.01)
USPC .......... 360/99.08; 310/67 R; 310/90; 384/110

(58) Field of Classification Search
CPC ...... F16C 17/10; F16C 33/107; F16C 33/745; F16C 32/0659; F16C 2370/12; G11B 19/2036; G11B 19/2009; H02K 7/08; H02K 7/085; H02K 5/1675
USPC ......... 360/99.08, 98.07, 99.04; 310/90, 67 R; 384/100–124
See application file for complete search history.

(56) References Cited

U.S. PATENT DOCUMENTS

| 5,403,098 A | 4/1995 | Yasui et al. |
|---|---|---|
| 5,533,811 A | 7/1996 | Polch et al. |

(Continued)

FOREIGN PATENT DOCUMENTS

| DE | 10 2011 014 369 A1 | 9/2012 |
|---|---|---|
| DE | 10 2011 014 371 A1 | 9/2012 |

(Continued)

OTHER PUBLICATIONS

Kimura et al., "Dynamic Pressure Bearing and Spindle Motor Using the Same", U.S. Appl. No. 12/952,223, filed Nov. 23, 2010.
Kimura et al., "Bearing Apparatus, Spindle Motor, and Disk Drive Apparatus", U.S. Appl. No. 12/791,147, filed Jun. 1, 2010.

(Continued)

*Primary Examiner* — Craig A. Renner
(74) *Attorney, Agent, or Firm* — Keating & Bennett, LLP (57) ABSTRACT

A motor includes a stationary portion and a rotating portion that is rotatable about a central axis extending in a vertical direction with respect to the stationary portion. The stationary portion includes a shaft and a cup portion. The shaft extends in an axial direction and is fixed to the cup portion. The rotating portion includes a sleeve portion including at least a portion thereof arranged inside the cup portion, and is arranged opposite to the shaft. The cup portion includes a cylindrical portion, a bottom plate portion, and a first conical portion. The cylindrical portion is radially opposite to an outer circumferential surface of the sleeve portion. The bottom plate portion is inside the cylindrical portion. The first conical portion extends upward from an inner end portion of the bottom plate portion.

20 Claims, 5 Drawing Sheets

(51) Int. Cl.
    *F16C 17/10*     (2006.01)
    *H02K 5/167*     (2006.01)

(56) References Cited

U.S. PATENT DOCUMENTS

| | | |
|---|---|---|
| 5,558,443 A | 9/1996 | Zang |
| 5,880,545 A | 3/1999 | Takemura et al. |
| 6,211,592 B1 | 4/2001 | Ichiyama |
| 6,246,136 B1 | 6/2001 | Ichiyama |
| 8,277,125 B2 | 10/2012 | Kimura et al. |
| 8,567,067 B2 | 10/2013 | Yamaguchi et al. |
| 8,587,895 B1 | 11/2013 | Sumiji et al. |
| 8,630,063 B2 | 1/2014 | Sumiji et al. |
| 2004/0090702 A1 | 5/2004 | Aiello et al. |
| 2004/0096131 A1 | 5/2004 | Aiello et al. |
| 2004/0156568 A1 | 8/2004 | Woldemar et al. |
| 2004/0165797 A1 | 8/2004 | Oku et al. |
| 2004/0175062 A1 | 9/2004 | Nishimura et al. |
| 2005/0031237 A1 | 2/2005 | Gomyo et al. |
| 2005/0111769 A1 | 5/2005 | Haga |
| 2005/0225187 A1 | 10/2005 | Hafen et al. |
| 2006/0002638 A1 | 1/2006 | Ichiyama |
| 2006/0002641 A1 | 1/2006 | Ichiyama |
| 2006/0039634 A1 | 2/2006 | Ichiyama |
| 2006/0039636 A1 | 2/2006 | Ichiyama |
| 2006/0051001 A1 | 3/2006 | Nishimura et al. |
| 2006/0182374 A1 | 8/2006 | Schwamberger et al. |
| 2006/0210205 A1 | 9/2006 | Engesser et al. |
| 2006/0222276 A1 | 10/2006 | Uenosono |
| 2007/0030591 A1 | 2/2007 | Engesser et al. |
| 2007/0133911 A1 | 6/2007 | Nishimoto et al. |
| 2007/0140606 A1 | 6/2007 | Feng et al. |
| 2007/0154123 A1 | 7/2007 | Gomyo et al. |
| 2007/0177832 A1 | 8/2007 | Gotoh et al. |
| 2007/0211971 A1 | 9/2007 | Obara et al. |
| 2008/0006332 A1 | 1/2008 | Ishizawa et al. |
| 2008/0056104 A1 | 3/2008 | Nishimura et al. |
| 2008/0063332 A1 | 3/2008 | Yamamoto et al. |
| 2008/0187257 A1 | 8/2008 | Engesser et al. |
| 2008/0292228 A1 | 11/2008 | Yamashita et al. |
| 2009/0129710 A1 | 5/2009 | Ito et al. |
| 2009/0140587 A1 | 6/2009 | Popov et al. |
| 2009/0140588 A1 | 6/2009 | Drautz et al. |
| 2009/0279818 A1 | 11/2009 | Le et al. |
| 2010/0124387 A1 | 5/2010 | Fuss et al. |
| 2010/0142869 A1 | 6/2010 | Grantz et al. |
| 2010/0266225 A1 | 10/2010 | Yamashita et al. |
| 2010/0296190 A1 | 11/2010 | Yamada et al. |
| 2010/0321823 A1 | 12/2010 | Oe et al. |
| 2011/0019303 A1 | 1/2011 | Yamada et al. |
| 2011/0123139 A1 | 5/2011 | Kimura et al. |
| 2011/0192210 A1 | 8/2011 | Yamashita et al. |
| 2012/0033325 A1 | 2/2012 | Mizukami et al. |
| 2012/0033326 A1 | 2/2012 | Mizukami et al. |
| 2012/0033327 A1 | 2/2012 | Mizukami et al. |
| 2012/0033328 A1 | 2/2012 | Mizukami et al. |
| 2012/0033329 A1 | 2/2012 | Mizukami et al. |
| 2012/0033330 A1 | 2/2012 | Mizukami et al. |
| 2012/0063030 A1 | 3/2012 | Yamada et al. |
| 2012/0243397 A1 | 9/2012 | Yamamoto et al. |
| 2012/0326543 A1 | 12/2012 | Kimura et al. |
| 2013/0077190 A1 | 3/2013 | Kimura et al. |
| 2013/0083426 A1 | 4/2013 | Tamaoka et al. |
| 2013/0083427 A1 | 4/2013 | Iwasaki et al. |
| 2013/0120868 A1 | 5/2013 | Mizukami et al. |
| 2013/0128379 A1 | 5/2013 | Mizukami et al. |
| 2013/0194701 A1 | 8/2013 | Fukushima |
| 2013/0242429 A1 | 9/2013 | Iwasaki et al. |
| 2014/0016229 A1 | 1/2014 | Sekii et al. |
| 2014/0078617 A1 | 3/2014 | Sekii et al. |
| 2014/0078879 A1 | 3/2014 | Sekii et al. |

FOREIGN PATENT DOCUMENTS

| | | |
|---|---|---|
| JP | 06-028335 U | 4/1994 |
| JP | 06-121484 A | 4/1994 |
| JP | 07-336924 A | 12/1995 |
| JP | 2002-005171 A | 1/2002 |
| JP | 2003-56555 A | 2/2003 |
| JP | 2003-61295 A | 2/2003 |
| JP | 2003-092867 A | 3/2003 |
| JP | 2003-244886 A | 8/2003 |
| JP | 2004-173377 A | 6/2004 |
| JP | 2005-048890 A | 2/2005 |
| JP | 2006-105390 A | 4/2006 |
| JP | 2006-226388 A | 8/2006 |
| JP | 2007-162759 A | 6/2007 |
| JP | 2009-041671 A | 2/2009 |
| JP | 2009-133361 A | 6/2009 |
| JP | 2009-136143 A | 6/2009 |
| JP | 2010-121775 A | 6/2010 |
| JP | 2010-144858 A | 7/2010 |
| JP | 2011-002024 A | 1/2011 |
| JP | 2011-2024 A | 1/2011 |
| JP | 2012-257428 A | 12/2012 |
| WO | 2006/120719 A1 | 11/2006 |

OTHER PUBLICATIONS

Oe et al., "Bearing Apparatus, Spindle Motor, and Disk Drive Apparatus", U.S. Appl. No. 12/793,851, filed Jun. 4, 2010.
Yamada et al., "Fluid Dynamic Bearing Apparatus, Spindle Motor, and Disk Drive Apparatus", U.S. Appl. No. 12/742,931, filed May 14, 2010.
Yamada et al., "Fluid Dynamic Bearing Apparatus, Spindle Motor, and Disk Drive Apparatus", U.S. Appl. No. 12/899,658, filed Oct. 7, 2010.
Yamada et al., "Fluid Dynamic Bearing Apparatus, Spindle Motor, and Disk Drive Apparatus", U.S. Appl. No. 13/299,542, filed Nov. 18, 2011.
Kimura et al., "Bearing Apparatus, Spindle Motor, and Disk Drive Apparatus", U.S. Appl. No. 13/602,420, filed Sep. 4, 2012.
Kimura et al., "Bearing Apparatus, Spindle Motor, and Disk Drive Apparatus", U.S. Appl. No. 13/681,500, filed Nov. 20, 2012.
Kimura et al., "Bearing Apparatus, Spindle Motor, and Disk Drive Apparatus", U.S. Appl. No. 13/602,348, filed Sep. 4, 2012.
Iwasaki et al., "Motor and Disk Drive Apparatus", U.S. Appl. No. 13/613,109, filed Sep. 13, 2012.
Tamaoka et al., "Motor and Disk Drive Apparatus", U.S. Appl. No. 13/613,106, filed Sep. 13, 2012.
Iwasaki et al., "Motor and Disk Drive Apparatus", U.S. Appl. No. 13/613,108, filed Sep. 13, 2012.
Sekii et al., "Spindle Motor and Disk Drive Apparatus", U.S. Appl. No. 13/767,205, filed Feb. 14, 2013.
Sekii et al., "Bearing Apparatus, Spindle Motor, and Disk Drive Apparatus", U.S. Appl. No. 13/789,796, filed Mar. 8, 2013.
Sekii et al., "Bearing Apparatus, Spindle Motor, and Disk Drive Apparatus", U.S. Appl. No. 13/790,089, filed Mar. 8, 2013.
Sato et al., "Spindle Motor and Disk Drive Apparatus", U.S. Appl. No. 131798,857, filed Mar. 13, 2013.
Fukushima, "Motor and Disk Drive Apparatus,", U.S. Appl. No. 13/751,380, filed Jan. 28, 2013.
Watanabe et al., "Spindle Motor and Disk Drive Apparatus", U.S. Appl. No. 13/898,921, filed May 21, 2013.
Kimura et al., "Bearing Mechanism, Motor, and Disk Drive Apparatus", U.S. Appl. No. 13/775,475, filed Feb. 25, 2013.
Sumiji et al., "Bearing Mechanism, Motor, and Disk Drive Apparatus", U.S. Appl. No. 13/775,467, filed Feb. 25, 2013.
Sumiji et al., "Bearing Mechanism, Motor, and Disk Drive Apparatus", U.S. Appl. No. 13/785,297, filed Mar. 5, 2013.
English translation of Official Communication issued in International Patent Application No. PCT/JP2009/059556, mailed on Jan. 20, 2011.
Kimura, et al.; "Bearing Apparatus, Spindle Motor, and Disk Drive Apparatus"; U.S. Appl. No. 14/024,868, filed Sep. 12, 2013.
Ando, et al.; "Spindle Motor, and Disk Drive Apparatus"; U.S. Appl. No. 14/330,207, filed Jul. 14, 2014.

MOTOR INCLUDING DYNAMIC BEARING WITH SEAL PORTION AND DISK DRIVE APPARATUS INCLUDING THE SAME

BACKGROUND OF THE INVENTION

1. Field of the Invention

The present invention relates to a motor and a disk drive apparatus.

2. Description of the Related Art

A spindle motor arranged to rotate a disk is conventionally installed in a disk drive apparatus, such as a hard disk drive. The disk drive apparatus includes the disk, a housing, a stator, an FPC (Flexible Printed Circuit), and so on. The housing includes a cover member, a base portion, and so on.

Motors are installed in electronic devices (e.g., disk drive apparatuses, tablet terminals, etc.). In recent years, the electronic devices have been reduced in thickness and size such that there is a need for a reduction in the thickness and size of the motors installed in the electronic devices.

In general, motors include shafts, hubs, stators, base portions, and so on. The height of the motor is determined by the length of the shaft. A structure in which the shaft is fixed to a plate-shaped base plate is adopted to reduce the height of the motor. However, the thickness of the base portion is also reduced to achieve a reduction in the thickness of the motor. As a result, the thickness of the base plate is not sufficient to fix the shaft. There is a possibility that application of an external force or the like to the motor will cause the shaft to be detached from the base plate, or cause the shaft to become tilted with respect to the base plate, for example. This may result in an inability to stably rotate a rotating portion, such as the hub.

There is accordingly a demand for a structure which enables the shaft to be fixed to the base plate while allowing a reduction in the height of the motor as a whole.

SUMMARY OF THE INVENTION

A motor according to a preferred embodiment of the present invention includes a stationary portion and a rotating portion. The rotating portion is arranged to be rotatable about a central axis extending in a vertical direction with respect to the stationary portion. The stationary portion includes a shaft and a cup portion. The shaft is arranged to extend in an axial direction. The shaft is fixed to the cup portion. The rotating portion includes a sleeve portion. The sleeve portion includes at least a portion thereof arranged inside the cup portion, and is arranged opposite to the shaft. The cup portion includes a cylindrical portion, a bottom plate portion, and a first conical portion. The cylindrical portion is arranged radially opposite to an outer circumferential surface of the sleeve portion. The bottom plate portion is arranged inside the cylindrical portion. The first conical portion is arranged to extend upward from an inner end portion of the bottom plate portion, and is fixed to the shaft. A lubricant is arranged between the sleeve portion and a combination of the shaft and the cup portion. A first seal portion is defined in a gap between the outer circumferential surface of the sleeve portion and an inner circumferential surface of the cylindrical portion. A liquid surface of the lubricant is located in the first seal portion. At least one of an outer circumferential surface of the first conical portion and an inner circumferential surface of the sleeve portion includes a first dynamic pressure generating groove array. The first dynamic pressure generating groove array is arranged to induce a dynamic pressure in the lubricant.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
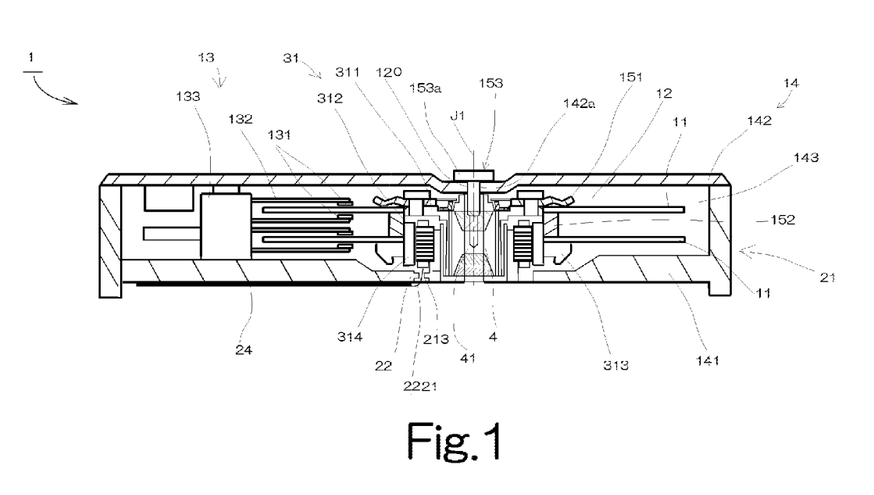
FIG. 1 is a vertical cross-sectional view of a disk drive apparatus according to a preferred embodiment of the present invention.

It is assumed herein that an upper side and a lower side along a central axis of a motor in FIG. 1 are referred to simply as an "upper side" and a "lower side", respectively. It should be noted, however, that the above definitions of the upper and lower sides are not meant to indicate relative positions or directions of different members or portions when actually installed in a device. In addition, a direction parallel or substantially parallel to the central axis is referred to by the term "axial direction", "axial", or "axially", radial directions centered on the central axis are simply referred to by the term "radial direction", "radial", or "radially", and a circumferential direction about the central axis is simply referred to by the term "circumferential direction", "circumferential", or "circumferentially".

FIG. 1 is a vertical cross-sectional view of a disk drive apparatus 1. The disk drive apparatus 1 includes a motor 12 according to a preferred embodiment of the present invention. The disk drive apparatus 1 is a so-called hard disk drive. The disk drive apparatus 1 preferably includes, for example, at least one disk-shaped disk 11, on which information is recorded, the motor 12, an access portion 13, a clamper 151, and a housing 14. The motor 12 is arranged to rotate while holding the disk(s) 11. The access portion 13 is arranged to perform at least one of "reading" and "writing" of information from or to the disk(s) 11. In this preferred embodiment, the number of disks 11 preferably is two, for example.

The housing 14 preferably includes a cup-shaped first housing member 141 and a plate-shaped second housing member 142. The disks 11, the motor 12, the access portion 13, and the clamper 151 are accommodated in the housing 14. In the disk drive apparatus 1, the second housing member 142 is preferably coupled to the first housing member 141 by a method such as, for example, welding to define the housing 14. The housing 14 defines an airtight interior space 143, and no or only an extremely small amount of dirt or dust is arranged in the interior space 143. The interior of the housing 14 is preferably filled with a helium gas.

The two disks 11 are preferably arranged at regular intervals in an axial direction through a spacer 152. The disks 11 are clamped by the clamper 151 and the motor 12. The access portion 13 preferably includes at least one head 131, at least one arm 132 arranged to support the head 131, and a head actuator mechanism 133. In this preferred embodiment, the number of heads 131 and the number of arms 132 are both preferably four, for example.

Each of the heads 131 is arranged in close proximity to one of the disks 11 to magnetically perform at least one of the "reading" and the "writing" of information. The head actuator mechanism 133 is arranged to actuate each of the arms 132 to move an associated one of the heads 131 relative to an associated one of the disks 11. The above mechanism enables the head 131 to make access to a desired location on the disk 11 with the head 131 being arranged in close proximity to the rotating disk 11 to perform one of the "reading" and the "writing" of information.

Figure 2:
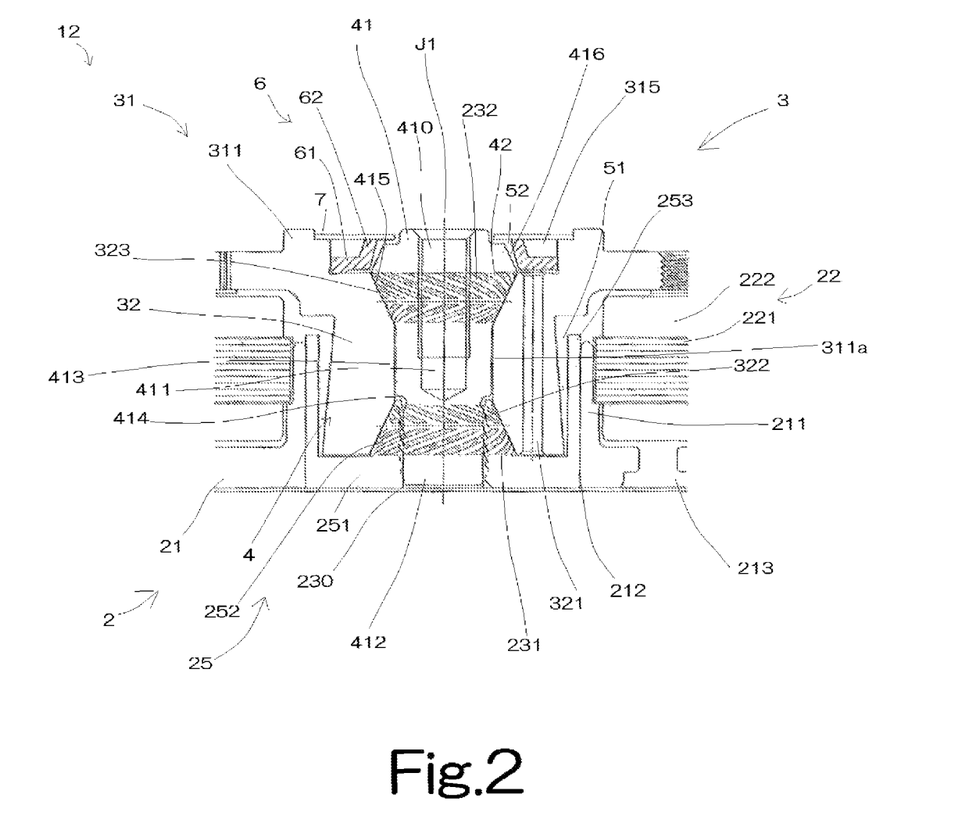
FIG. 2 is a vertical cross-sectional view of a motor according to a preferred embodiment of the present invention.

FIG. 2 is a vertical cross-sectional view of the motor 12 according to the present preferred embodiment of the present invention. The motor 12 is preferably a so-called outer-rotor motor. The motor 12 preferably includes a stationary portion 2, a rotating portion 3, and a fluid dynamic bearing mechanism 4 (hereinafter referred to as a "bearing mechanism 4"). The rotating portion 3 is supported through the bearing mechanism 4 to be rotatable about a central axis J1 of the motor 12 with respect to the stationary portion 2. The central axis J1 of the motor 12 is a central axis of each of the stationary portion 2, the rotating portion 3, and the bearing mechanism 4 as well.

As illustrated in FIGS. 1 and 2, the stationary portion 2 preferably includes a base plate 21, a stator 22, a wiring 24, and a cup portion 25. The base plate 21 is a substantially plate-shaped member. The base plate 21 is arranged to define a portion of the first housing member 141.

The cup portion 25 preferably includes a bottom plate portion 251, a first conical portion 252, and a cylindrical portion 253. The bottom plate portion 251 is in the shape of a flat or substantially flat plate. In this preferred embodiment, the bottom plate portion 251 preferably is disk-shaped or substantially disk-shaped. The cylindrical portion 253 is arranged to extend axially upward from a radially outer end portion of the bottom plate portion 251.

The first conical portion 252 is preferably cone-shaped or substantially cone-shaped. The first conical portion 252 is arranged to extend axially upward from a radially inner end portion of the bottom plate portion 251. An outside surface of the first conical portion 252 is preferably a curved surface. The radial distance between the first conical portion 252 and the central axis J1 is arranged to gradually decrease with increasing height. Note that the outside surface of the first conical portion 252 may be an inclined surface which is angled with respect to the central axis J1.

A through hole 230 is arranged to pass through the bottom plate portion 251 and the first conical portion 252 in the axial direction. That is, the through hole 230 is preferably defined by an inside surface of the first conical portion 252. An axially upper end portion of the first conical portion 252 is located axially below an axially upper end portion of the cylindrical portion 253.

A first dynamic pressure generating groove array 231 is arranged in the outside surface of the first conical portion 252. The first dynamic pressure generating groove array 231 is preferably defined by at least one dynamic pressure generating groove. The dynamic pressure generating grooves defining the first dynamic pressure generating groove array 231 are preferably grooves arranged in a so-called herringbone pattern. The first dynamic pressure generating groove array 231 is arranged to induce a dynamic pressure in a lubricant described below when the motor 12 is running.

A holder 211 is arranged in a center or a substantial center of the base plate 21. The holder 211 is cylindrical or substantially cylindrical. The holder 211 is arranged to extend axially upward from an upper surface of the base plate 21. A base through hole 212 is defined by an inside surface of the holder 211. The base through hole 212 is arranged to pass through the base plate 21 in the axial direction.

The cup portion 25 is arranged in the base through hole 212. An outside surface of the cylindrical portion 253 is arranged radially opposite to the inside surface of the holder 211. A lower surface of the bottom plate portion 251 is arranged axially above a lower surface of the base plate 21.

Note that the lower surface of the bottom plate portion 251 may be arranged to be flush or substantially flush with the lower surface of the base plate 21. Also note that the lower surface of the bottom plate portion 251 may be arranged to project axially downward below the lower surface of the base plate 21.

In this preferred embodiment, the cup portion 25 is preferably fixed to the base plate 21 through loose fitting and adhesion. In the case where the cup portion 25 and the base plate 21 are fixed through an adhesive, the adhesive is preferably arranged between the inside surface of the holder 211 and the outside surface of the cylindrical portion 253.

Note that the adhesive may be arranged in the vicinity of a boundary between the bottom plate portion 251 and a periphery of the base through hole 212. In this case, the adhesive is preferably arranged to cover an entire circumferential extent of the boundary between the bottom plate portion 251 and a periphery of the base through hole 212.

Also note that at least one of the outside surface of the cylindrical portion 253 and the inside surface of the holder 211 may include an uneven surface. In this case, a surface area over which the adhesive is applied on the cup portion 25 and the holder 211 when the cup portion 25 is arranged inside the holder 211 is increased. The cup portion 25 is thus securely fixed to the holder 211.

As illustrated in FIGS. 1 and 2, the stator 22 is fixed to a circumference of the holder 211. The stator 22 preferably includes a stator core 221 and coils 222. Each coil 222 is wound around the stator core 221.

As illustrated in FIG. 1, the wiring 24 is arranged on the lower surface of the base plate 21. The wiring 24 is arranged to extend radially outward away from the stator 22. Lead wires 2221 from the coils 222 are connected to the wiring 24. The lead wires 2221 are preferably drawn out through at least one outlet 213 arranged in the first housing member 141. The wiring 24 is preferably, for example, an FPC (a flexible printed circuit board). The wiring 24 may alternatively be defined by wires continuous with the lead wires 2221.

As illustrated in FIGS. 1 and 2, the rotating portion 3 preferably includes a rotor hub 31 and a sleeve portion 32. The rotor hub 31 includes a hub body 311, a hub cylindrical portion 312, and a disk mount portion 313.

The hub body 311 preferably is disk-shaped or substantially disk-shaped. The hub cylindrical portion 312 is arranged to project downward from a radially outer end portion of the hub body 311. The disk mount portion 313 is arranged to extend radially outward from a lower portion of the hub cylindrical portion 312.

A rotor magnet 314 which is preferably cylindrical or substantially cylindrical is fixed to an inside of the hub cylindrical portion 312. The rotor magnet 314 is arranged radially opposite to the stator 22. When the motor 12 is driven, a torque is produced between the stator 22 and the rotor magnet 314.

Note that a back iron may be arranged between an inside surface of the hub cylindrical portion 312 and the rotor magnet 314. The back iron is preferably annular or substantially annular in accordance with the shape of the rotor magnet 314. The back iron is preferably a magnetic member.

The sleeve portion 32 preferably is cylindrical or a substantially cylindrical portion. The sleeve portion 32 is arranged in a substantial center of the hub body 311. The sleeve portion 32 is arranged to extend axially downward from the hub body 311. A central hole portion 311a is preferably arranged to pass through the sleeve portion 32 in the axial direction. An outside surface of the sleeve portion 32 is arranged radially opposite to an inside surface of the cylindrical portion 253.

The outside surface of the sleeve portion 32 is an inclined surface which is angled with respect to the central axis J1. The radial distance between the central axis J1 and the outside surface of the sleeve portion 32 is arranged to gradually decrease with increasing height. A first seal portion 51 is preferably defined in a gap between the outside surface of the sleeve portion 32 and the inside surface of the cylindrical portion 253. A liquid surface of the lubricant described below is located in the first seal portion 51.

Note that the outside surface of the sleeve portion 32 may be a curved surface. Even in this case, the radial distance between an inside surface and the outside surface of the sleeve portion 32 is preferably arranged to gradually decrease with increasing height.

A lower end portion of the sleeve portion 32 is preferably arranged axially opposite to an upper surface of the bottom plate portion 251.

The sleeve portion 32 preferably includes a communicating hole 321. The communicating hole 321 is arranged to axially join an upper end portion of the sleeve portion 32 and the lower end portion of the sleeve portion 32 to each other. An axially lower opening portion of the communicating hole 321 is preferably opposed to the bottom plate portion 251.

The bearing mechanism 4 preferably includes a shaft 41, the sleeve portion 32, the first conical portion 252, and the lubricant.

The shaft 41 is preferably a cylindrical or substantially cylindrical member. The shaft 41 is arranged to extend in a vertical direction along the central axis J1. The shaft 41 preferably includes a first outside diameter portion 412 and a second outside diameter portion 413.

The first outside diameter portion 412 is an axially lower portion of the shaft 41. The shaft 41 is inserted in the central hole portion 311a. The first outside diameter portion 412 is inserted in the through hole 230. The first outside diameter portion 412 is preferably fixed to the cup portion 25 (that is, to an inside surface of the through hole 230) through at least one of tight fitting and adhesion.

In more detail, the first outside diameter portion 412 is preferably fixed to the bottom plate portion 251 and the first conical portion 252. In this preferred embodiment, the first outside diameter portion 412 is fixed in the through hole 230 through tight fitting (e.g., press fitting, shrink fitting, or the like).

In this preferred embodiment, a lower end portion of the first outside diameter portion 412 is located axially above the lower surface of the bottom plate portion 251. However, the lower end portion of the first outside diameter portion 412 may be arranged to be flush or substantially flush with the lower surface of the bottom plate portion 251. The lower end portion of the first outside diameter portion 412 may be arranged to project axially downward below the lower surface of the bottom plate portion 251.

The first outside diameter portion 412 may be arranged to be flush or substantially flush with the lower surface of the base plate 21. The first outside diameter portion 412 may be arranged to project axially downward below the lower surface of the base plate 21.

The second outside diameter portion 413 is arranged axially above the first outside diameter portion 412. The second outside diameter portion 413 is arranged to have an outside diameter greater than the outside diameter of the first outside diameter portion 412. A shoulder portion 414 is preferably defined between the first outside diameter portion 412 and the second outside diameter portion 413. An upper end portion of the first conical portion 252 is arranged opposite to the shoulder portion 414 with a gap intervening therebetween.

A hole portion 411 is arranged in the shaft 41. The hole portion 411 does not pass therethrough. The hole portion 411 is arranged to include an opening at an upper end portion of the shaft 41. The hole portion 411 is arranged to extend downward from an upper end of the shaft 41 along the central axis J1. The axial length of the hole portion 411 is arranged to be longer than the axial length of a portion of the shaft 41 where the hole portion 411 is not defined. An upper portion of the hole portion 411 preferably includes a screw hole portion 410.

As illustrated in FIG. 1, the second housing member 142 preferably includes a hole portion 142a. The hole portion 142a is arranged in or substantially in a center of the second housing member 142. A screw 153 is inserted into the screw hole portion 410 and the hole portion 142a. The shaft 41 is thus fixed to the second housing member 142. A sealant 120 is preferably arranged in a gap defined by an inner circumferential portion of the screw hole portion 410, an inner circumferential portion of the hole portion 142a, and an outer circumferential portion of the screw 153. The sealant 120 is also preferably arranged in a gap defined by an upper portion of the hole portion 142a and a head portion 153a of the screw 153. An adhesive preferably is used as the sealant 120, for example.

As illustrated in FIG. 2, an inside surface of the sleeve portion 32 preferably includes a first sleeve inside surface 322. In this preferred embodiment, the first sleeve inside surface 322 is an inclined surface which is angled with respect to the central axis J1. The first sleeve inside surface 322 is arranged opposite to the outside surface of the first conical portion 252 with a gap intervening therebetween. The radial distance between the first sleeve inside surface 322 and the central axis J1 is arranged to gradually decrease with increasing height.

Note that the first sleeve inside surface 322 may not necessarily be an inclined surface. For example, the first sleeve inside surface 322 may alternatively be a curved surface, if so desired. Even in this case, the radial distance between the first sleeve inside surface 322 and the central axis J1 is preferably arranged to gradually decrease with increasing height.

In the case where the outside surface of the first conical portion 252 is an inclined surface, the first sleeve inside surface 322 is preferably arranged to be an inclined surface parallel or substantially parallel to the outside surface of the first conical portion 252.

The lubricant is arranged between the sleeve portion 32 and a combination of the shaft 41 and the cup portion 25. In more detail, the lubricant is preferably arranged to fill a gap between the cup portion 25 and the sleeve portion 32, a gap between the shaft 41 and the sleeve portion 32, the communicating hole 321, and a portion of a first annular recessed portion 315 (which will be described below). As a result, liquid surfaces of the lubricant are located in the first seal portion 51 and a second seal portion 52 (which will be described below). The sleeve portion 32 is arranged to rotate with respect to the shaft 41 once the motor 12 is driven. The first dynamic pressure generating groove array 231 is arranged to induce a dynamic pressure in a portion of the lubricant which is present in the gap between the first conical portion 252 and the first sleeve inside surface 322 at this time. The sleeve portion 32 is thus rotatably supported by the shaft 41.

Note that the first dynamic pressure generating groove array 231 may be arranged in the first sleeve inside surface 322. The first dynamic pressure generating groove array 231 may be arranged in each of the outside surface of the first conical portion 252 and the first sleeve inside surface 322.

Furthermore, the lubricant is also preferably arranged between the lower end portion of the sleeve portion 32 and the upper surface of the bottom plate portion 251. The lubricant is thus able to axially support the sleeve portion 32 once the motor 12 is driven.

As described above, the first seal portion 51 is preferably defined in the gap between the outside surface of the sleeve portion 32 and the inside surface of the cylindrical portion 253. The first seal portion 51 is preferably a capillary seal. As illustrated in FIG. 2, the gap dimension of the first seal portion 51 is arranged to gradually decrease with decreasing height. The liquid surface of the lubricant is located in the first seal portion 51. This contributes to preventing the lubricant from traveling to a lower surface of the hub body 311 or toward the stator 22 through the gap between the outside surface of the sleeve portion 32 and the inside surface of the cylindrical portion 253 when the motor 12 is running.

As illustrated in FIG. 2, the inside surface of the sleeve portion 32 preferably includes a second sleeve inside surface 323. In this preferred embodiment, the second sleeve inside surface 323 is an inclined surface which is angled with respect to the central axis J1. The second sleeve inside surface 323 is arranged axially above the first sleeve inside surface 322. The radial distance between the central axis J1 and the second sleeve inside surface 323 is arranged to gradually increase with increasing height.

Note that the second sleeve inside surface 323 may be a curved surface. Even in this case, the radial distance between the central axis J1 and the second sleeve inside surface 323 is preferably arranged to gradually increase with increasing height.

The shaft 41 preferably includes a second conical portion 42. The second conical portion 42 is arranged axially opposite to the first conical portion 252. The second conical portion 42 is conical or substantially conical. An outside surface of the second conical portion 42 preferably includes a first shaft outside surface 415. In this preferred embodiment, the first shaft outside surface 415 is a curved surface. The first shaft outside surface 415 is arranged opposite to the second sleeve inside surface 323 with a gap intervening therebetween. The radial distance between the first shaft outside surface 415 and the central axis J1 is arranged to gradually increase with increasing height.

Note that the first shaft outside surface 415 may be an inclined surface which is angled with respect to the central axis J1. Even in this case, the radial distance between the first shaft outside surface 415 and the central axis J1 is preferably arranged to gradually increase with increasing height. Furthermore, in the case where the first shaft outside surface 415 is an inclined surface, the first shaft outside surface 415 is preferably an inclined surface parallel or substantially parallel to the second sleeve inside surface 323. Note that, although the first shaft outside surface 415 is preferably defined together with the shaft 41 as a single monolithic member, this is not essential to the present invention. For example, in other preferred embodiments of the present invention, the first shaft outside surface 415 may be defined by a member separate from the shaft 41.

A second dynamic pressure generating groove array 232 is arranged in the first shaft outside surface 415. The second dynamic pressure generating groove array 232 preferably is defined by at least one dynamic pressure generating groove. The dynamic pressure generating grooves defining the second dynamic pressure generating groove array 232 are preferably grooves arranged in a herringbone pattern.

As described above, the lubricant is preferably arranged in the gap defined by the sleeve portion 32 and the shaft 41. That is, the lubricant is arranged in a gap between the inside surface of the sleeve portion 32 and an outside surface of the shaft 41. The sleeve portion 32 is preferably arranged to rotate with respect to the shaft 41 once the motor 12 is driven. The second dynamic pressure generating groove array 232 is arranged to induce a dynamic pressure in a portion of the lubricant which is present in the gap between the first shaft outside surface 415 and the second sleeve inside surface 323. The shaft 41 is thus able to support the sleeve portion 32.

Note that the second dynamic pressure generating groove array 232 may be arranged in the second sleeve inside surface 323. The second dynamic pressure generating groove array 232 may be arranged in each of the first shaft outside surface 415 and the second sleeve inside surface 323.

The first annular recessed portion 315 is arranged at the upper end portion of the sleeve portion 32. The first annular recessed portion 315 is defined by the hub body portion 311, the upper end portion of the sleeve portion 32, and the outside surface of the shaft 41. The first annular recessed portion 315 is arranged to extend in a circumferential direction about the central axis J1. In this preferred embodiment, the first annular recessed portion 315 is annular or substantially annular. An axially upper opening portion of the communicating hole 321 is arranged in the first annular recessed portion 315.

The outside surface of the shaft 41 preferably includes a second shaft outside surface 416. In this preferred embodiment, the second shaft outside surface 416 is an inclined surface which is angled with respect to the central axis J1. The radial distance between the central axis J1 and the second shaft outside surface 416 is arranged to gradually decrease with increasing height.

The second shaft outside surface 416 is arranged axially above the first shaft outside surface 415. The second shaft outside surface 416 is arranged to connect with the first shaft outside surface 415. The second shaft outside surface 416 is a portion of an outer circumferential surface of the shaft 41 which defines the first annular recessed portion 315. The axial position of a boundary between the second shaft outside surface 416 and the first shaft outside surface 415 is preferably the same or substantially the same as the axial position of the axially upper opening portion of the through hole 230.

Note that the second shaft outside surface 416 may be a curved surface. Even in this case, the radial distance between the central axis J1 and the second shaft outside surface 416 is arranged to gradually decrease with increasing height.

An annular member 6 is arranged in the first annular recessed portion 315. The annular member 6 is preferably fixed in the first annular recessed portion 315 through an adhesive or the like.

The annular member 6 preferably includes an annular portion 61 and an extension portion 62. The annular portion 61 is arranged to extend in the circumferential direction. In this preferred embodiment, the annular portion 61 is annular or substantially annular. The annular portion 61 is preferably in the shape of a flat or substantially flat plate. The annular portion 61 is arranged to cover at least a portion of the axially upper opening portion of the communicating hole 321.

The shaft extension portion 62 is a tubular or substantially tubular portion. The shaft extension portion 62 is preferably arranged to extend axially upward from a radially inner end portion of the annular portion 61. The extension portion 62 is arranged radially opposite to the second shaft outside surface 416. The extension portion 62 is angled with respect to the central axis J1. The radial distance between the central axis J1 and the shaft extension portion 62 is arranged to gradually decrease with increasing height.

The second seal portion 52 is defined by the extension portion 62 and the second shaft outside surface 416. The second seal portion 52 is preferably a capillary seal. As illustrated in FIG. 2, the gap dimension of the second seal portion 52 is arranged to gradually decrease with decreasing height. As described above, the lubricant is arranged in at least a portion of the first annular recessed portion 315. The liquid surface of the lubricant is located in the second seal portion 52.

Moreover, a cap member 7 is preferably arranged axially above the sleeve portion 32. The cap member 7 is annular or substantially annular. The cap member 7 is fixed to the hub body portion 311 and an upper end portion of the shaft extension portion 62 through an adhesive or the like.

The cap member 7 is arranged axially above the first annular recessed portion 315. The cap member 7 is arranged to cover the first annular recessed portion 315. A radially inner end portion of the cap member 7 is arranged radially inward of a gap between the second shaft outside surface 416 and an inside surface of the shaft extension portion 62.

While preferred embodiments of the present invention have been described above, the present invention is not limited to the above-described preferred embodiments, and a variety of modifications are possible.

For example, in place of the cap member 7, the annular member 6 may be arranged to also fulfill the role of the cap member 7.

Figure 3:
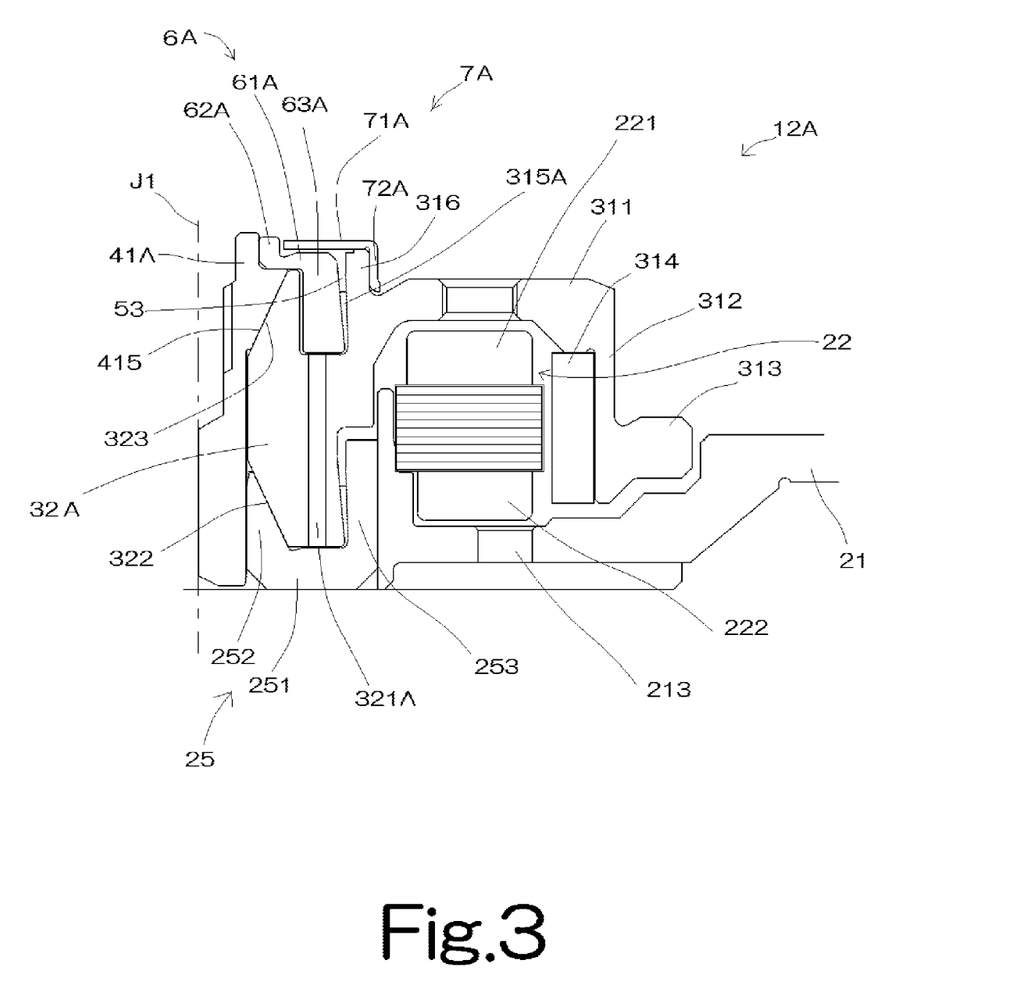
FIG. 3 is a vertical cross-sectional view of a motor according to a preferred embodiment of the present invention.

FIG. 3 is a vertical cross-sectional view of a motor 12A according to another preferred embodiment of the present invention. As illustrated in FIG. 3, an outside surface of a shaft 41A does not include the second shaft outside surface 416. An upper end portion of the shaft 41A is preferably arranged to be flush or substantially flush with an upper end portion of a sleeve portion 32A.

A first annular recessed portion 315A is preferably arranged at the upper end portion of the sleeve portion 32A. The first annular recessed portion 315A is arranged to be recessed axially downward in an upper portion of the sleeve portion 32A. The first annular recessed portion 315A is annular or substantially annular, extending in the circumferential direction. The sleeve portion 32A is preferably arranged to have the same or substantially the same shape as that of the sleeve portion 32 except for the first annular recessed portion 315A. The sleeve portion 32A preferably includes a communicating hole 321A arranged to join an upper end portion and a lower end portion of the sleeve portion 32A to each other. An axially upper opening portion of the communicating hole 321A is arranged in the first annular recessed portion 315A. A lubricant is arranged in the first annular recessed portion 315A and the communicating hole 321A in a manner similar to that described above.

An annular member 6A is preferably arranged in the first annular recessed portion 315A. The annular member 6A preferably includes an annular portion 61A, a shaft extension portion 62A, and a sleeve extension portion 63A. The annular portion 61A is an annular or substantially annular member. The annular portion 61A is arranged to cover a boundary between the upper end portion of the sleeve portion 32A and the outside surface of the shaft 41A. The annular portion 61A is arranged to cover at least a portion of the upper end portion of the sleeve portion 32A and at least a portion of the upper end portion of the shaft 41A.

The sleeve extension portion 63A is a tubular or substantially tubular member. The sleeve extension portion 63A is arranged to extend axially downward from a radially outer end portion of the annular portion 61A. At least a portion of the sleeve extension portion 63A is arranged in the first annular recessed portion 315A. A lower end portion of the sleeve extension portion 63A is arranged axially opposite to the axially upper opening portion of the communicating hole 321A.

An outside surface of the sleeve extension portion 63A is arranged radially opposite to a radially outer inside surface of the first annular recessed portion 315A. In this preferred embodiment, the outside surface of the sleeve extension portion 63A is an inclined surface which is angled with respect to a central axis J1. The radial distance between the central axis J1 and the outside surface of the sleeve extension portion 63A is arranged to gradually decrease with increasing height. An inside surface of the sleeve extension portion 63A is arranged radially opposite to a radially inner inside surface of the first annular recessed portion 315A.

Note that the outside surface of the sleeve extension portion 63A may be a curved surface. Even in this case, the radial distance between the central axis J1 and the outside surface of the sleeve extension portion 63A is preferably arranged to gradually decrease with increasing height.

A gap between the outside surface of the sleeve extension portion 63A and the radially outer inside surface of the first annular recessed portion 315A is preferably arranged to define a third seal portion 53. A liquid surface of the lubricant is located in the third seal portion 53. This contributes to preventing an external force or the like from causing the lubricant to travel axially upward out of the gap between the radially outer inside surface of the first annular recessed portion 315A and the outside surface of the sleeve extension portion 63A.

The shaft extension portion 62A is an annular or substantially annular member. The shaft extension portion 62A is arranged to extend axially upward from a radially inner end portion of the annular portion 61. An inside surface of the shaft extension portion 62A is arranged radially opposite to the outside surface of the shaft 41A. The shaft extension portion 62A is arranged to surround the outside surface of the shaft 41A.

As illustrated in FIG. 3, a hub extension portion 316 is preferably arranged at an upper surface of a hub body portion 311. The hub extension portion 316 is arranged to extend axially upward from an opening portion of the first annular recessed portion 315A. An upper end portion of the hub extension portion 316 is arranged axially above an upper surface of the annular portion 61A. A radially inner side surface of the hub extension portion 316 is arranged to define a portion of the first annular recessed portion 315.

A cap member 7A is a cup-shaped or substantially cup-shaped member. The cap member 7A is preferably fixed to the hub extension portion 316 through, for example, adhesion, tight fitting, or the like. In more detail, the cap member 7A preferably includes a cover portion 71A and a tubular portion 72A.

The tubular portion 72A is tubular, extending in the axial direction. An inside surface of the tubular portion 72A is arranged radially opposite to an outside surface of the hub extension portion 316. The outside surface of the hub extension portion 316 is fixed to the inside surface of the tubular portion 72A through, for example, tight fitting, adhesion, or the like.

The cover portion 71A is annular or substantially annular. The cover portion 71A is arranged to extend radially inward from an upper end portion of the tubular portion 72A. The cover portion 71A is arranged axially opposite to the annular portion 61A. A radially inner end portion of the cover portion 71A is arranged radially opposite to the shaft extension portion 62A. A gap is preferably defined between the radially inner end portion of the cover portion 71A and an outside surface of the shaft extension portion 62A. The cover portion 71A is arranged to cover the first annular recessed portion 315A. The cover portion 71A is arranged to cover the third seal portion 53.

Accordingly, even if the lubricant travels axially upward out of the third seal portion 53, the lubricant will hit a lower surface of the cover portion 71A. This contributes to preventing the lubricant from leaking out of the motor 12A.

Figure 4:
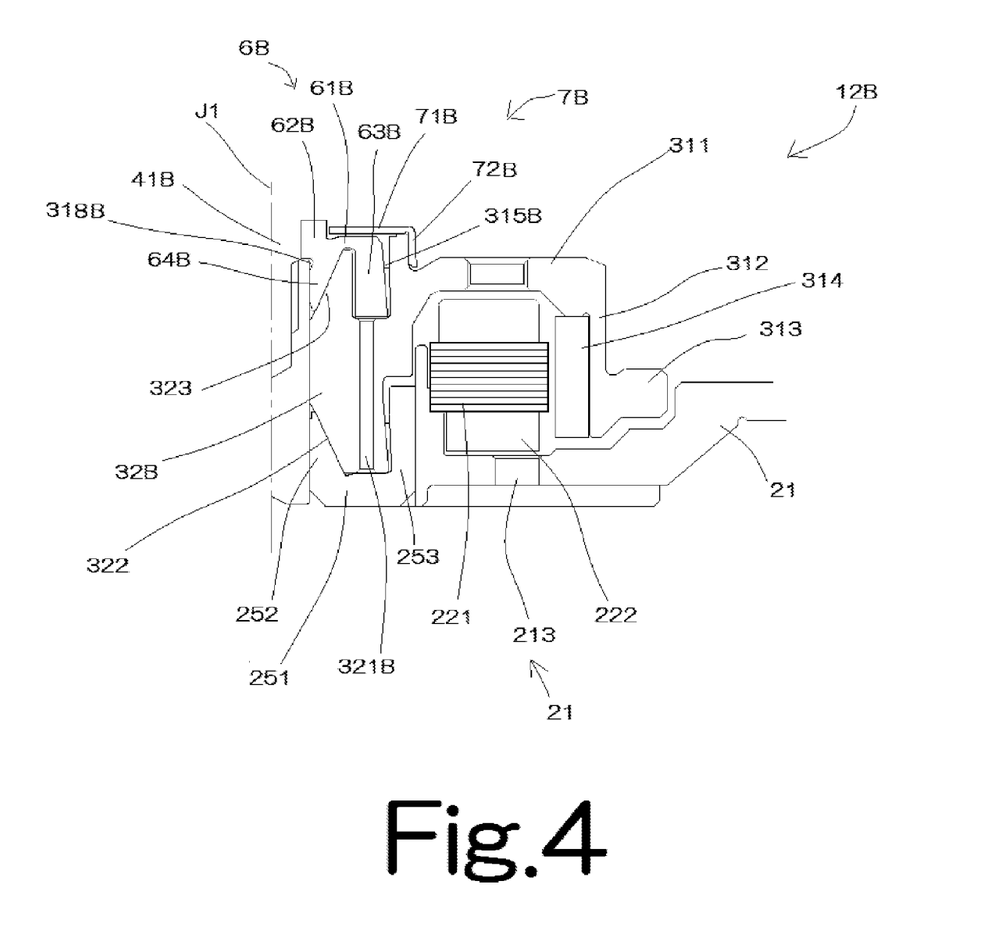
FIG. 4 illustrates an example modification of a preferred embodiment of the present invention.

Furthermore, note that the shape of the annular member is not limited to that described above. FIG. 4 illustrates an example modification of a preferred embodiment of the present invention.

As illustrated in FIG. 4, an outer circumferential surface of a shaft 41B preferably includes neither the first shaft outside surface 415 nor the second shaft outside surface 416 described above. A second annular recessed portion 318B is defined between the outer circumferential surface of the shaft 41B and a second sleeve inside surface 323. The second annular recessed portion 318B is arranged to extend in the circumferential direction. The second annular recessed portion 318B is annular or substantially annular.

The structures of a sleeve 32B and a first annular recessed portion 315B are preferably the same or substantially the same as those of the sleeve portion 32A and the first annular recessed portion 315A described above, respectively. A cap member 7B preferably includes a cover portion 71B and a tubular portion 72B. The structures of the cap member 7B, the cover portion 71B, and the tubular portion 72B are preferably the same or substantially the same as those of the cap member 7A, the cover portion 71A, and the tubular portion 72A, respectively.

An annular member 6B preferably includes an annular portion 61B, a shaft extension portion 62B, a sleeve extension portion 63B, and a lower extension portion 64B. The annular portion 61B and the sleeve extension portion 63B are preferably the same or substantially the same as the annular portion 61A and the sleeve extension portion 63A described above, respectively.

A radially inner end portion of the annular portion 61B is arranged radially inward of an outside surface of an upper end portion of the shaft 41B. The radially inner end portion of the annular portion 61B is arranged axially opposite to the upper end portion of the shaft 41B. The upper end portion of the shaft 41B is preferably arranged to contact a lower surface of the annular portion 61B. The annular member 6B is thus positioned with respect to the upper end portion of the shaft 41B.

The lower extension portion 64B is annular or substantially annular. The lower extension portion 64B is arranged to extend axially downward from the lower surface of the annular portion 61B. At least a portion of the lower extension portion 64B is arranged to axially overlap with the shaft extension portion 62B. The lower extension portion 64B is preferably arranged in the second annular recessed portion 318B. An upper end portion of the sleeve portion 32B is arranged axially opposite to the lower surface of the annular portion 61B.

An inside surface of the lower extension portion 64B is preferably arranged radially opposite to an outside surface of the shaft 41B. An inside surface of the shaft extension portion 62B is preferably fixed to the outside surface of the shaft 41B through, for example, tight fitting and adhesion or the like.

An outside surface of the lower extension portion 64B is arranged radially opposite to an inside surface of the sleeve portion 32B. The outside surface of the lower extension portion 64B is preferably a curved surface. The radial distance between the lower extension portion 64B and a central axis J1 is arranged to gradually increase with increasing height.

Note that the outside surface of the lower extension portion 64B may be an inclined surface which is angled with respect to the central axis J1. In the case where the second sleeve inside surface 323 is an inclined surface, the outside surface of the lower extension portion 64B is preferably arranged to be parallel or substantially parallel to the second sleeve inside surface 323.

At least one third dynamic pressure generating groove array (not shown) is preferably arranged in at least one of the outside surface of the lower extension portion 64B and the second sleeve inside surface 323. Each third dynamic pressure generating groove array is defined by at least one dynamic pressure generating groove. The dynamic pressure generating grooves defining the third dynamic pressure generating groove array are preferably herringbone grooves. The third dynamic pressure generating groove array is arranged to induce a dynamic pressure in a lubricant.

The sleeve portion 32B includes a communicating hole 321B similar to the communicating hole 321A described above. Once a motor 12B is driven, the lubricant travels from a cup 25 to the first annular recessed portion 315B through the communicating hole 321B. The lubricant thereafter travels to a gap between an inside surface of the sleeve extension portion 64B and a radially inner inside surface of the first annular recessed portion 315B. The lubricant further travels to a gap between the outside surface of the lower extension portion 64B and the inside surface of the sleeve portion 32B. The third dynamic pressure generating groove array is arranged to generate a dynamic pressure in the lubricant at this time. The shaft 41B is thus able to rotatably support the sleeve portion 32B.

Figure 5:
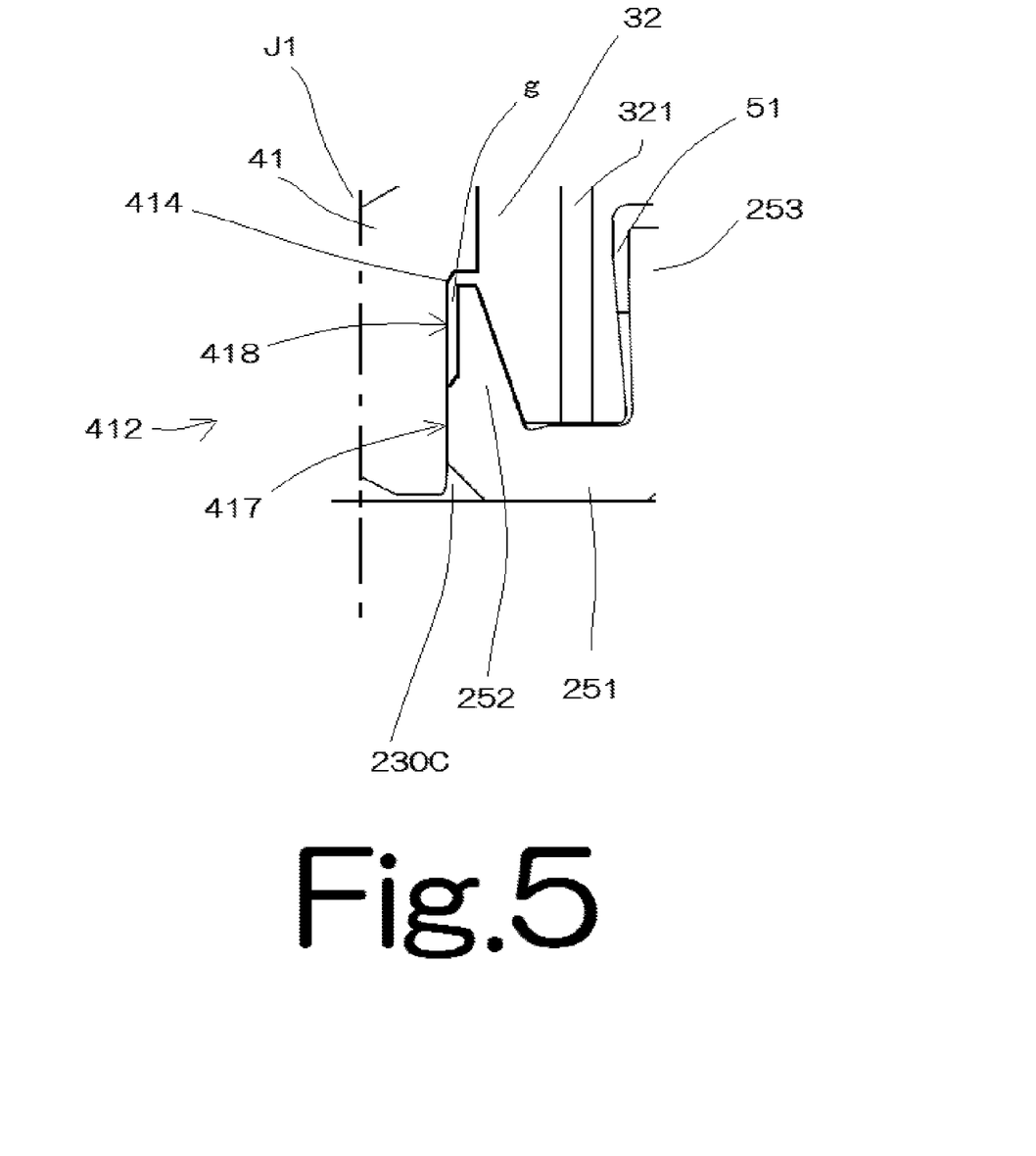
FIG. 5 illustrates another example modification of a preferred embodiment of the present invention.

In the preferred embodiment described above, the shaft 41 is preferably fixed in the through hole 230 through, for example, tight fitting. Note, however, that the shaft 41 may alternatively be fixed in the through hole 230 through, for example, both adhesion and tight fitting. FIG. 5 is a diagram illustrating another example modification of a preferred embodiment of the present invention. FIG. 5 is a partial cross-sectional view illustrating a first conical portion 252 and its vicinity.

As illustrated in FIG. 5, a first outside diameter portion 412 preferably includes a press fitting portion 417 and an insertion portion 418.

The press fitting portion 417 is preferably arranged at a lower end portion of the first outside diameter portion 412. The press fitting portion 417 is inserted in a through hole 230C. The press fitting portion 417 is preferably fixed to an inside surface of the through hole 230C through tight fitting. In this preferred example modification, the press fitting portion 417 is fixed in the through hole 230C through press fitting. An area over which the first conical portion 252 (that is, the through hole 230C) and the press fitting portion 417 of the first outside diameter portion 412 are in a tight-fit condition is preferably arranged to radially overlap with a bottom plate portion 251.

The insertion portion 418 is arranged axially above the press fitting portion 417. An outside surface of the insertion portion 418 is arranged radially opposite to the inside surface of the through hole 230C.

A gap g is preferably defined between the outside surface of the insertion portion 418 and the inside surface of the through hole 230C. The gap g is located axially above the area of the tight-fit condition. A shoulder portion 414, as described above, is preferably arranged axially above the gap g. In other words, in the through hole 230C, the inside diameter of a portion which is opposed to the outside surface of the insertion portion 418 is arranged to be greater than the inside diameter of a portion which is opposed to an outside surface of the press fitting portion 417. The gap g is arranged to radially overlap with a first seal portion 51.

An adhesive is preferably arranged in the gap g. The insertion portion 418 is thus fixed to the inside surface of the through hole 230C.

That is, a shaft 41 is preferably fixed to the bottom plate portion 251 through both tight fitting and adhesion. This contributes to reducing deformations of the shaft 41 and the through hole caused by application of a stress when the press fitting portion 417 is fixed to the through hole 230C through tight fitting. This enables the shaft 41 to be positioned precisely with respect to a cup portion 25.

Note that an uneven surface may be arranged in at least one of the inside surface of the through hole 230C and at least a portion of the outside surface of the insertion portion 418. This will result in an increase in an area over which it is in contact with the outside surface of the insertion portion 418 and the inside surface of the through hole 230C. As a result, the shaft 41 is securely fixed to the cup portion 25.

Furthermore, note that the press fitting portion 417 may be fixed in the through hole 230C through various types of tight fitting, such as, for example, shrink fitting, instead of press fitting.

Also note that the communicating hole does not necessarily need to be arranged to connect an upper portion and a lower portion of the sleeve portion to each other. The axially upper or lower opening portion of the communicating hole may be arranged in the inside surface or the outside surface of the sleeve portion. That is, the direction of extension of a surface which defines the communicating hole may be either parallel or substantially parallel to the central axis J1 or angled with respect to the central axis J1.

Preferred embodiments of the present invention and modifications thereof are applicable, for example, to spindle motors for use in disk drive apparatuses, motors installed in electronic devices, fan motors, and so on.

Features of the above described preferred embodiments and the modifications thereof may be combined appropriately as long as no conflict arises.

While preferred embodiments of the present invention and modifications thereof have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a stationary portion; and
   a rotating portion arranged to be rotatable about a central axis extending in a vertical direction with respect to the stationary portion; wherein
   the stationary portion includes:
      a shaft arranged to extend in an axial direction; and
      a cup portion fixed to the shaft;
   the rotating portion includes:
      a sleeve portion including at least a portion thereof arranged inside the cup portion, and arranged opposite to the shaft;
   the cup portion includes:
      a cylindrical portion arranged radially opposite to an outer circumferential surface of the sleeve portion;
      a bottom plate portion arranged inside the cylindrical portion; and
      a first conical portion arranged to extend upward from an inner end portion of the bottom plate portion, and fixed to the shaft;
   a lubricant is arranged between the sleeve portion and a combination of the shaft and the cup portion;
   a first seal portion is defined in a gap between the outer circumferential surface of the sleeve portion and an inner circumferential surface of the cylindrical portion, and a liquid surface of the lubricant is located in the first seal portion; and
   at least one of an outer circumferential surface of the first conical portion and an inner circumferential surface of the sleeve portion includes a first dynamic pressure generating groove array arranged to induce a dynamic pressure in the lubricant.

2. The motor according to claim 1, wherein the first conical portion is fixed to the shaft in a tight-fit condition.

3. The motor according to claim 2, wherein an adhesive is arranged between the first conical portion and the shaft.

4. The motor according to claim 2, wherein an area over which the first conical portion and the shaft are in the tight-fit condition is arranged to radially overlap with the bottom plate portion.

5. The motor according to claim 4, wherein
   a gap is defined between the first conical portion and the shaft above the area of the tight-fit condition; and
   an adhesive is arranged in the gap.

6. The motor according to claim 5, wherein the gap is arranged to radially overlap with the first seal portion.

7. The motor according to claim 1, wherein
   the shaft includes:
      a first outside diameter portion including at least a portion thereof arranged inside the first conical portion;
      a second outside diameter portion arranged axially above the first outside diameter portion, and larger than the first outside diameter portion; and
      a shoulder portion arranged to connect the first outside diameter portion and the second outside diameter portion with each other; and
   the shoulder portion is arranged axially opposite to an upper end portion of the first conical portion with a gap intervening therebetween.

8. The motor according to claim 7, wherein
   the first conical portion is fixed to the first outside diameter portion in a tight-fit condition; and
   an adhesive is arranged between the first conical portion and the first outside diameter portion.

9. The motor according to claim 8, wherein an area over which the first conical portion and the first outside diameter portion are in the tight-fit condition is arranged to radially overlap with the bottom plate portion.

10. The motor according to claim 8, wherein
    the gap is defined between the first conical portion and the first outside diameter portion above the area of the tight-fit condition; and
    the adhesive is arranged in the gap.

11. The motor according to claim 10, wherein the gap is arranged to radially overlap with the first seal portion.

12. The motor according to claim 1, wherein
the shaft includes a second conical portion arranged axially opposite to the first conical portion; and
at least one of an outer circumferential surface of the second conical portion and the inner circumferential surface of the sleeve portion includes a second dynamic pressure generating groove array arranged to induce a dynamic pressure in the lubricant.

13. The motor according to claim 1, wherein
an upper portion of the sleeve portion includes a first annular recessed portion arranged to extend in a circumferential direction about the central axis; and
an annular member is arranged to cover the upper portion of the sleeve portion, at least a portion of the annular member being arranged in the first annular recessed portion.

14. The motor according to claim 13, wherein a second seal portion is defined in a gap between an outside surface of the annular member and an inside surface of the first annular recessed portion, and a liquid surface of the lubricant is located in the second seal portion.

15. The motor according to claim 13, wherein
a second annular recessed portion extending in the circumferential direction is defined in a gap between an outer circumferential surface of the shaft and the inner circumferential surface of the sleeve portion; and
the annular member includes an extension portion including at least a portion thereof arranged in the second annular recessed portion.

16. The motor according to claim 13, wherein the rotating portion includes a cap member arranged opposite to the annular member, and arranged to cover at least a portion of the first annular recessed portion.

17. The motor according to claim 1, wherein an axial end portion of the shaft is arranged axially above a lower surface of the cup portion.

18. The motor according to claim 1, wherein
the stationary portion includes a plate-shaped base member;
the base member includes a tubular holder arranged to extend in the axial direction; and
the cup portion is arranged inside the holder.

19. The motor according to claim 18, wherein an inside surface of the holder is fixed to an outside surface of the cup portion through at least one of adhesion and tight fitting.

20. A disk drive apparatus comprising:
the motor of claim 1;
at least one disk arranged to be rotated by the motor;
a head portion arranged to perform at least one of reading and writing from or to the disk; and
a housing arranged to accommodate the motor, the disk, and the head portion therein.

* * * * *